United States Patent
Hoshino et al.

(10) Patent No.: US 8,379,750 B2
(45) Date of Patent: Feb. 19, 2013

(54) RADIO COMMUNICATION FOR REDUCING THE SIGNALING AMOUNT IN SELECTING A PLURALITY OF BEAMS IN PRE-CODING FOR ENHANCING THROUGHPUT

(75) Inventors: Masayuki Hoshino, Kanagawa (JP); Katsuhiko Hiramatsu, Leuven (BE); Yasuaki Yuda, Kanagawa (JP); Ryohei Kimura, Kanagawa (JP)

(73) Assignee: Panasonic Corporation, Osaka (JP)

( * ) Notice: Subject to any disclaimer, the term of this patent is extended or adjusted under 35 U.S.C. 154(b) by 525 days.

(21) Appl. No.: 12/664,953

(22) PCT Filed: Jun. 24, 2008

(86) PCT No.: PCT/JP2008/001643
§ 371 (c)(1),
(2), (4) Date: Dec. 16, 2009

(87) PCT Pub. No.: WO2009/004768
PCT Pub. Date: Jan. 8, 2009

(65) Prior Publication Data
US 2010/0189189 A1    Jul. 29, 2010

(30) Foreign Application Priority Data
Jul. 5, 2007  (JP) .................... 2007-177119

(51) Int. Cl.
H04B 7/02 (2006.01)
(52) U.S. Cl. ......... 375/267; 375/299; 455/101; 455/132
(58) Field of Classification Search .............. 375/267, 375/299; 455/101, 132
See application file for complete search history.

(56) References Cited

U.S. PATENT DOCUMENTS
7,599,443 B2 * 10/2009 Ionescu et al. ............ 375/267
(Continued)

FOREIGN PATENT DOCUMENTS
EP      1 865 644 A1   12/2007
WO   2005/114874 A1   12/2005
(Continued)

OTHER PUBLICATIONS
International Search Report for PCT/JP2008/001643.
(Continued)

Primary Examiner — Juan A Torres
(74) Attorney, Agent, or Firm — Pearne & Gordon LLP

(57) ABSTRACT

The signaling amount in selecting a plurality of beams is reduced in pre-coding to thereby enhance the throughput. To select a plurality of beams when the pre-coding is applied, when notification of a beam number is provided in a feedback signal from a user equipment 102 as a reception station to a radio base station 101 as a transmission station, a superior beam number having a high quality rank with small time variation is bound up and fixed for a predetermined time period and notification of only a inferior beam number is provided within the time period. For example, to select three beams from six beams, first, notification of the superior two beam numbers (beam numbers 'b' and 'c') is provided and the superior beam numbers are fixed for a predetermined time period and then notification of only the inferior one beam number (beam number 'e') is provided within the predetermined time period for reducing the signaling amount for providing beam number notification.

10 Claims, 11 Drawing Sheets

U.S. PATENT DOCUMENTS

| | | | |
|---|---|---|---|
| 7,609,780 B2 * | 10/2009 | Sadowsky | 375/297 |
| 7,664,533 B2 * | 2/2010 | Logothetis et al. | 455/562.1 |
| 7,702,029 B2 * | 4/2010 | Kotecha et al. | 375/267 |
| 7,711,330 B2 * | 5/2010 | Yang et al. | 455/101 |
| 7,965,619 B2 * | 6/2011 | Taira et al. | 370/203 |
| 2005/0037799 A1 * | 2/2005 | Braun et al. | 455/525 |
| 2007/0099578 A1 * | 5/2007 | Adeney et al. | 455/69 |
| 2007/0249402 A1 * | 10/2007 | Dong et al. | 455/562.1 |
| 2008/0008110 A1 | 1/2008 | Kishigami et al. | |
| 2008/0318606 A1 * | 12/2008 | Tsutsui et al. | 455/500 |

FOREIGN PATENT DOCUMENTS

| | | |
|---|---|---|
| WO | 2006/118081 A1 | 11/2006 |

OTHER PUBLICATIONS

Huawei et al; Overhead reduction of UL CQI signalling for E-UL-TRA DL, 3GPP TSG RAN LTE Ad Hoc, Jun. 30, 2006, pp. 1-9, R1-061819.

NTT DoCoMo, et al; "Investigation on PMI Indication Schemes for Single-User MIMO Precoding in E-UTRA Downlink", 3GPP TSG RAN WG1 Meeting #51bis, Jan. 18, 2008 pp. 1-8, R1-080248.

Samsung et al; "MIMO for Long Term Evolution", 3GPP TSG RAN WG1 Meeting #42, London UK, Aug. 29-Sep. 2, 2005, R1-050889.

International Search Report for PCT/JP2008/001643, Sep. 2008.

* cited by examiner

RADIO COMMUNICATION FOR REDUCING THE SIGNALING AMOUNT IN SELECTING A PLURALITY OF BEAMS IN PRE-CODING FOR ENHANCING THROUGHPUT

CROSS-REFERENCE TO RELATED APPLICATIONS

This application is based on Japanese Patent Application No. 2007-177119 filed on Jul. 5, 2007. The contents of this application are herein incorporated by reference.

TECHNICAL FIELD

The present invention relates to a radio communication system, a radio communication apparatus, and a radio communication method that can be applied to MIMO (Multiple-Input Multiple-Output), etc., for conducting communications using a plurality of antennas.

BACKGROUND ART

In recent years, attention has been focused on MIMO (Multiple-Input Multiple-Output) as an art for realizing high-speed large-capacity communications in a radio communication technology. The MIMO is an art of transmitting data using a plurality of antennas in both transmission and reception. Different data are transmitted from a plurality of transmission antennas respectively, whereby the transmission capacity can be enhanced without enlarging the time and frequency resources.

In the MIMO, when data are transmitted from a plurality of antennas, a beam transmission method of forming a beam by transmitting weighted data from each antenna is available. The beam transmission has the advantage that the reception power of a terminal is increased due to the beam gain.

Spatial multiplexing using a plurality of beams is also possible, in which case beam transmission suited for the state of a propagation channel is performed, whereby the transmission capacity can be improved as compared with spatial multiplexing using antennas. In this case, it is necessary to send information of a beam suited for the propagation channel state of the receiving party to the transmission side.

At present, in 3GPP (3rd Generation Partnership Project) of an international standardization organization of mobile telephones, standardization activity of an LTE (Long Term Evolution) system is carried out as a system for realizing higher-speed larger-capacity communications than communications of the current third generation mobile telephone. Also in the LTE, the MIMO is positioned as an indispensable technology to meet the required condition for high-speed large-capacity transmission. In the LTE, the transmission beam technology is described as a technology of pre-coding.

FIG. 11 schematically shows transmission beam formation by pre-coding. For example, to use it for a cellular system for mobile communications of mobile telephones, etc., when a signal is transmitted through multiple antennas from a radio base station 201, the beam number indicating the optimum beam pattern in a user equipment 202 is set according to a feedback signal from the user equipment 202 of a mobile station. The radio base station 201 weights the transmission signal of each antenna in response to the beam number, thereby forming a transmission beam which becomes a beam pattern in an appropriate direction for the receiving user equipment 202. In the example in FIG. 11, four beams of beams 'a' to 'd' can be formed as beam numbers; to select two beams from among them for use, for example, two transmission beams of beams 'b' and 'c' are formed according to a feedback signal from the user equipment 202.

According to the pre-coding, a beam responsive to the feedback signal from the user equipment is selected for use among the stipulated beam patterns transmitted from the radio base station, whereby the signal strength when a signal is transmitted to the user equipment can be ensured and in addition, it is made possible to transmit a plurality of signals at the same time using orthogonal beams. Thus, the advantages of coverage enlargement due to the improvement in the signal strength and improvement in throughput due to the space division can be expected.

In the pre-coding, to make a selection of a plurality of beams (which will be hereinafter represented as "subset selection"), the information amount to represent all combinations that can be taken becomes large and thus a large signaling amount, namely, many resources become necessary as control information. Specifically, to select R beams from N beams, $_NC_R$ combinations become necessary; for example, to select three beams from six beams, five bits are required to represent $_6C_3=20$ candidates.

Non-patent document 1: 3GPP TSG RAN WG1 #42, R1-050889, Samsung, "MIMO for Long Term Evolution", Aug. 29-Sep. 2, 2005

DISCLOSURE OF THE INVENTION

Problems to be Solved by the Invention

As described above, to make a subset selection in the pre-coding, control information to select one or a plurality of beams from among beams is contained in a feedback signal and a large signaling amount becomes necessary to represent all combinations that can be taken. Accordingly, it becomes necessary to allocate many resources to signaling concerning the subset selection and there is a problem of leading to throughput decrease.

In view of the circumstances described above, it is an object of the invention to provide a radio communication apparatus, a radio communication system, and a radio communication method capable of reducing the signaling amount in selecting a plurality of beams in pre-coding, thereby enhancing throughput.

Means for Solving the Problems

A radio communication apparatus according to an aspect of the invention is a radio communication apparatus for conducting communications using a plurality of antennas, the radio communication apparatus including: a beam selector which receives a signal from a radio transmission station and acquires a quality rank of each beam to select a predetermined number of beams formed by pre-coding in future transmission responsive to the propagation status of the received signal; a superior beam information generator which generates superior beam information concerning a superior beam having a high quality rank, of the beams as many as the predetermined number and fixes the superior beam information for a predetermined time period; an inferior beam information generator which generates inferior beam information concerning the remaining beam excluding the superior beam, of the beams as many as the predetermined number; and a feedback information transmitter which transmits feedback information containing the superior beam information for a part of the predetermined time period and feedback information containing only the inferior beam information for any other time period within the predetermined time period, to the radio transmission station.

Thus, the signaling amount when selecting a plurality of beams in the pre-coding can be reduced without performance degradation caused by a control delay, thereby enhancing the throughput.

The invention includes the radio communication apparatus, wherein the superior beam information generator generates as many pieces of superior beam information as a half or more of the predetermined number of beams, and wherein the inferior beam information generator generates as many pieces of inferior beam information as the remaining number of the predetermined number of beams as the inferior beam information.

The invention includes the radio communication apparatus, wherein the superior beam information generator generates as many pieces of superior beam information as a half or less of the predetermined number of beams, and wherein the inferior beam information generator generates as many pieces of inferior beam information as the remaining number of the predetermined number of beams as the inferior beam information.

The invention includes the radio communication apparatus, wherein when providing notification of the superior beam information, the feedback information transmitter transmits the feedback information containing the superior beam information using a resource required for providing notification of the inferior beam information.

Accordingly, it is made possible to provide notification of the superior beam information with high reliability.

The invention includes the radio communication apparatus, including a beam information resource controller which controls a resource of the beam information, wherein when providing notification of the superior beam information, the beam information resource controller performs resource control so as to generate the feedback information using at least a part of the resources secured for providing notification of the inferior beam information.

Accordingly, the signal strength at the time of providing notification of the superior beam information can be secured and it is made possible to provide notification of the superior beam information with high reliability.

The invention includes the radio communication apparatus, wherein when providing notification of the superior beam information, the beam information resource controller performs the resource control so as to generate the feedback information repeating the superior beam information using the surplus resources for providing notification of the inferior beam information excluding the inferior beam information.

Accordingly, the signal strength at the time of providing notification of the superior beam information can be secured and it is made possible to provide notification of the superior beam information with high reliability.

The invention includes the radio communication apparatus, including a superior beam fixing time period information giving section which gives information indicating the length of the predetermined time period fixing the superior beam information to the feedback information.

Accordingly, it is made possible to previously secure the timing of feeding back the superior beam information the next time, namely, the time of skipping feedback of the inferior beam information in response to a change in the propagation status. The time period of fixing the superior beam can be adaptively controlled in response to the propagation status.

The invention includes the radio communication apparatus, wherein the superior beam fixing time period information giving section sets the length of the predetermined time period based on time variation of a propagation channel to and from the radio transmission station.

Accordingly, the time period of fixing the superior beam can be adaptively set in response to the propagation status.

The invention includes the radio communication apparatus, including a superior beam change information giving section which gives superior beam change information for giving a command of changing the superior beam information if quality of the superior beam is degraded to the feedback information.

Accordingly, it is made possible to adaptively control the timing of feeding back the superior beam information the next time, namely, the time of skipping feedback of the inferior beam information in response to a change in the beam quality caused by a rapid change in the propagation status, etc.

The invention includes the radio communication apparatus, wherein if the superior beam change information giving section gives the superior beam change information, the superior beam change information giving section commands the feedback information transmitter to provide notification of the superior beam information in the next notification of beam information.

Accordingly, notification of the timing of feeding back the superior beam information can be provided and it is made possible to reliably acquire the superior beam information in the radio transmission station.

A radio communication apparatus according to the invention is a radio communication apparatus for conducting communications using a plurality of antennas, the radio communication apparatus including: a beam information acquisition section which receives pieces of feedback information from a radio reception station to which information is to be transmitted, and acquires beam information concerning a predetermined number of beams selected by the radio reception station from superior beam information concerning a superior beam having a high quality rank fixed for a predetermined time period, of the beams as many as the predetermined number contained in piece of the feedback information and inferior beam information concerning the remaining beam excluding the superior beam, contained in piece of the feedback information; a pre-coding processing section which performs pre-coding to form predetermined beams by weighting signals to be output to the plurality of antennas based on the acquired beam information; a control information generator which generates control information containing beam information of the beams formed by the pre-coding; and a transmitter which transmits the control information and the signal subjected to the pre-coding processing to the radio reception station.

Accordingly, the signaling amount from the radio reception station in selecting a plurality of beams in the pre-coding can be reduced and it is made possible to enhance throughput.

The invention includes the radio communication apparatus, wherein the beam information acquisition section comprises: a superior beam information retention section which retains the superior beam information fixed for the predetermined time period; and a beam information interpreter which interprets the beam information concerning the beams as many as the predetermined number according to the retained superior beam information and received inferior beam information.

Accordingly, it is made possible to interpret the beam information concerning the beams as many as the predetermined number according to the superior beam information and the inferior beam information acquired from the radio reception station and use the information for data transmission to which the pre-coding is applied.

The invention includes the radio communication apparatus, wherein the beam information acquisition section further includes a beam information switch section which outputs and retains the received beam information to and in the superior beam retention section at the timing of receiving the feedback information for providing superior beam notification and outputs the received beam information to the beam information interpreter at the timing of receiving the feedback information for providing inferior beam notification.

Accordingly, it is made possible to interpret the feedback information corresponding to each of the superior beam information fixed in the predetermined time period and the remaining inferior beam information, interpret the beam information concerning the beams as many as the predetermined number in the pre-coding, and use the information for data transmission.

The invention includes the radio communication apparatus, wherein the beam information acquisition section includes a superior beam fixing time period information acquisition section which acquires information indicating the length of the predetermined time period for fixing the superior beam information, and the beam information acquisition section acquires the superior beam information and the inferior beam information using the superior beam fixing time period information and acquires the beam information concerning the beams as many as the predetermined number.

Accordingly, it is made possible to interpret the feedback information indicating the length of the predetermined time period fixing the superior beam information, interpret the beam information concerning the beams as many as the predetermined number in the pre-coding, and use the information for data transmission.

The invention includes the radio communication apparatus, the beam information acquisition section includes a superior beam change information acquisition section which acquires superior beam change information for giving a command of changing the superior beam information if quality of the superior beam is degraded, and the beam information acquisition section acquires the superior beam information and the inferior beam information using the superior beam change information and acquires the beam information concerning the beams as many as the predetermined number.

Accordingly, it is made possible to interpret the feedback information for giving a command of changing the superior beam information, prepare for the fact that the superior beam information is contained in the next beam information notification, acquire the corresponding beam information, interpret the beam information concerning the beams as many as the predetermined number in the pre-coding, and use the information for data transmission.

The present invention provides a radio communication base station apparatus including any of the radio communication apparatus.

The present invention provides a radio communication mobile station apparatus including any of the radio communication apparatus.

A radio communication system according to the present invention is a radio communication system for conducting communications using a plurality of antennas, the radio communication system including: a first radio communication apparatus as a radio reception station including: a beam selector which receives a signal from a radio transmission station and acquires a quality rank of each beam to select a predetermined number of beams formed by pre-coding in future transmission responsive to the propagation status of the received signal; a superior beam information generator which generates superior beam information concerning a superior beam having a high quality rank, of the beams as many as the predetermined number and fixes the superior beam information for a predetermined time period; an inferior beam information generator which generates inferior beam information concerning the remaining beam excluding the superior beam, of the beams as many as the predetermined number; and a feedback information transmitter which transmits feedback information containing the superior beam information for a part of the predetermined time period and feedback information containing only the inferior beam information for any other time period within the predetermined time period to the radio transmission station, and a second radio communication apparatus as the radio transmission station including: a beam information acquisition section which receives pieces of feedback information from the radio reception station and acquires beam information concerning a predetermined number of beams selected by the radio reception station from the superior beam information contained in piece of the feedback information and the inferior beam information contained in piece of the feedback information; a pre-coding processing section which performs pre-coding to form predetermined beams by weighting signals to be output to the plurality of antennas based on the acquired beam information; a control information generator which generates control information containing beam information of the beams formed by the pre-coding; and a transmitter which transmits the control information and the signal subjected to the pre-coding processing to the radio reception station.

A radio communication method according to the present invention is a radio communication method for conducting communications using a plurality of antennas, the radio communication method including: a beam selecting step of receiving a signal from a radio transmission station and acquires a quality rank of each beam to select a predetermined number of beams formed by pre-coding in future transmission responsive to the propagation status of the received signal; a superior beam information generating step of generating superior beam information concerning a superior beam having a high quality rank, of the beams as many as the predetermined number and fixes the superior beam information for a predetermined time period; an inferior beam information generating step of generating inferior beam information concerning the remaining beam excluding the superior beam, of the beams as many as the predetermined number; a feedback information transmitting step of transmitting feedback information containing the superior beam information for a part of the predetermined time period and feedback information containing only the inferior beam information for any other time period within the predetermined time period to the radio transmission station; a beam information acquisition step of receiving pieces of feedback information from a radio reception station to which information is to be transmitted and acquiring beam information concerning a predetermined number of beams selected by the radio reception station from the superior beam information contained in piece of the feedback information and the inferior beam information contained in piece of the feedback information; a pre-coding processing step of performing pre-coding to form a predetermined beam by weighting signals to be output to the plurality of antennas based on the acquired beam information; a control information generation step of generating control information containing beam information of the beam formed by the pre-coding; and a transmission step of transmitting the control information and the signal subjected to the pre-coding processing to the radio reception station.

Advantages of the Invention

According to the invention, there can be provided a radio communication apparatus, a radio communication system, and a radio communication method capable of reducing the signaling amount in selecting a plurality of beams in the pre-coding, thereby enhancing the throughput.

Figure 1:
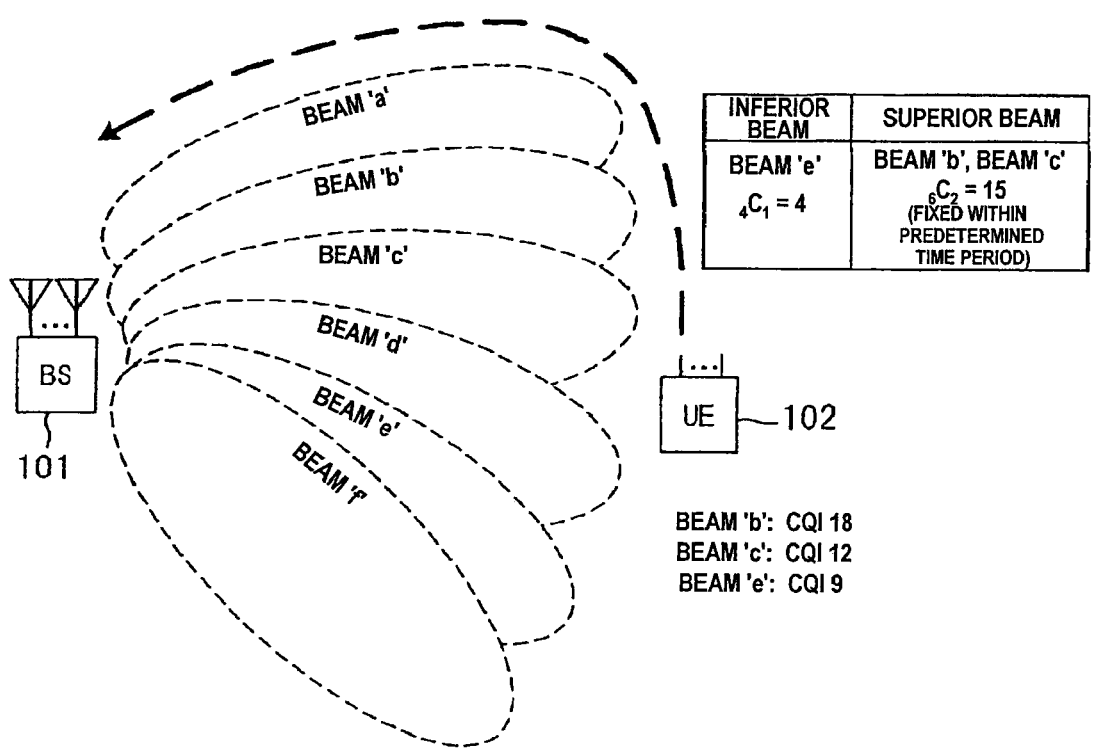
FIG. 1 shows beam number notification operation in embodiments.

DESCRIPTION OF REFERENCE NUMERALS AND SIGNS 11a, 11b Antenna
12a, 12b Reception RF section
13 Channel estimator
14 Control signal demodulator
15 MIMO demodulator
16 Decoder
17 CRC checker
18 Beam selector
19 Superior beam number generator
20 Inferior beam number generator
21 ACK/NACK generator
22 Encoder
23 Multiplexer
24 Transmission RF section
31 Encoder
32 Control signal generator
33 Multiplexer
35 Pre-coding processing section
36a, 36b Transmission RF section
37a, 37b Antenna
38 Reception RF section
39 Separating section
40 Demodulator-decoder
41 CRC checker
42 Superior beam number acquisition section
43 Superior beam number retention section
44 Beam number interpreter
51 Beam number resource controller
52 Superior beam expiration time giving section
53 Superior beam re-notification signal giving section
61, 62, 64 Beam number output switch section
63 Superior beam expiration time acquisition section
65 Superior beam re-notification signal acquisition section
101 Radio base station
102 User equipment

BEST MODE FOR CARRYING OUT THE INVENTION

In embodiments, configuration examples for performing pre-coding of weighting for a plurality of antennas and forming a beam in a radio communication system adopting MIMO are shown as examples of a radio communication system, a radio communication apparatus, and a retransmission control method according to the invention. The following embodiments are examples for description and the invention is not limited thereto.

To begin with, an outline of the embodiments will be described. FIG. 1 shows beam number notification operation in the embodiments. To form a plurality of beams by pre-coding, in each transmission path formed by a plurality of beams, a superior beam containing a main transmission path having a high quality rank tends to have large signal-to-interference-plus-noise ratio (SINR) over a long time. To feed back a plurality of selected beam numbers, if one variable is bound up, the number of candidates can be decreased to about a half from the binomial theorem.

In the embodiments, attention is focused on the points. To select a plurality of beams (to make a subset selection) when the pre-coding is applied, when notification of a beam number is provided in a feedback signal from a reception station to a transmission station, a superior beam number having a high quality rank with small time variation is bound up and fixed for a predetermined time period and notification of only an inferior beam number is provided within the predetermined time period. For example, notification of a superior beam number is provided at some timing such as the beginning of the predetermined time period and notification of only an inferior beam number is provided at any other timing within the predetermined time period. Accordingly, the signaling amount of information indicating the combinations of a plurality of selected beam numbers can be reduced without performance degradation caused by a control delay. Therefore, it is made possible to implement means for applying the pre-coding to a cellular system with a good characteristic.

Selective forming of a plurality of beams by the pre-coding can be applied to the case where a multi code word (MCW) is applied in MIMO data transmission, for example, and a beam is allocated to each code word for transmission, etc.

FIG. 1 illustrates the case where a radio base station (BS) 101 of a transmission station can form six beams, a user equipment (UE: User Equipment) 102 of a reception station selects three beams having a high quality rank from among the beams, and the superior two beams are fixed in a period based on a predetermined time period.

In the embodiment, in feedback for subset selection, the superior beams having a high quality rank (for example, the superior two beams) are bound up for a predetermined time period and notification of the superior beam numbers corresponding to the superior beams is not provided from the reception station to the transmission station. The reception station generates a feedback signal so as to provide notification of the inferior beam number corresponding to the inferior beam (in the example, remaining one inferior beam) selected so as to become the number of beams within the total number of selected beams (called the number of ranks) (in the example, three) from among the remaining inferior beams. The transmission station shares the superior beam numbers fixed for the predetermined time period with the reception station, interprets the inferior beam number corresponding to the remaining inferior beam according to the feedback signal from the reception station, and recognizes all selected beam numbers. The beam numbers thus obtained are used for the pre-coding at the data transmission.

Here, it is assumed that the quality of each beam corresponds to SINR at the reception, and the quality is indicated using a CQI (Channel Quality Indicator) value of information representing the reception quality relevant to any desired signal. A state in which, of beams 'a' to 'f', beam 'b' has CQI 18, beam 'c' CQI 12, beam 'e' CQI 9, and other beams have lower CQI values, for example, is considered. In an ordinary method, five bits are required to represent $_6C_3$=20 candidates as the information amount of a feedback signal in selecting three beams from six beams.

In contrast, in the embodiments, if the superior two beams are fixed, the information amount of a feedback signal in providing notification of the superior beams first in the pre-determined period needs only four bits capable of representing $_6C_2$=15 combinations because notification of combination to select two beams from a total of six beams is provided. In the example, the feedback signal is a signal for providing notification of the superior beams 'b' and 'c' from among the beams 'a' to 'f'. As the information amount of a feedback signal in providing notification of only the inferior beam in the predetermined period, two bits to represent $_4C_1$=four combinations can be used to provide notification of every beam number because notification of selection of one beam from the remaining four beams excluding the two fixed beams (the remaining one beam resulting from excluding two beams from the number of ranks (a total of three beams)) is provided. In the example, the feedback signal is a signal for providing notification of the inferior beam 'e' excluding the superior beams 'b' and 'c' from among the beams 'a' to 'f'.

FIRST EMBODIMENT

Figure 2:
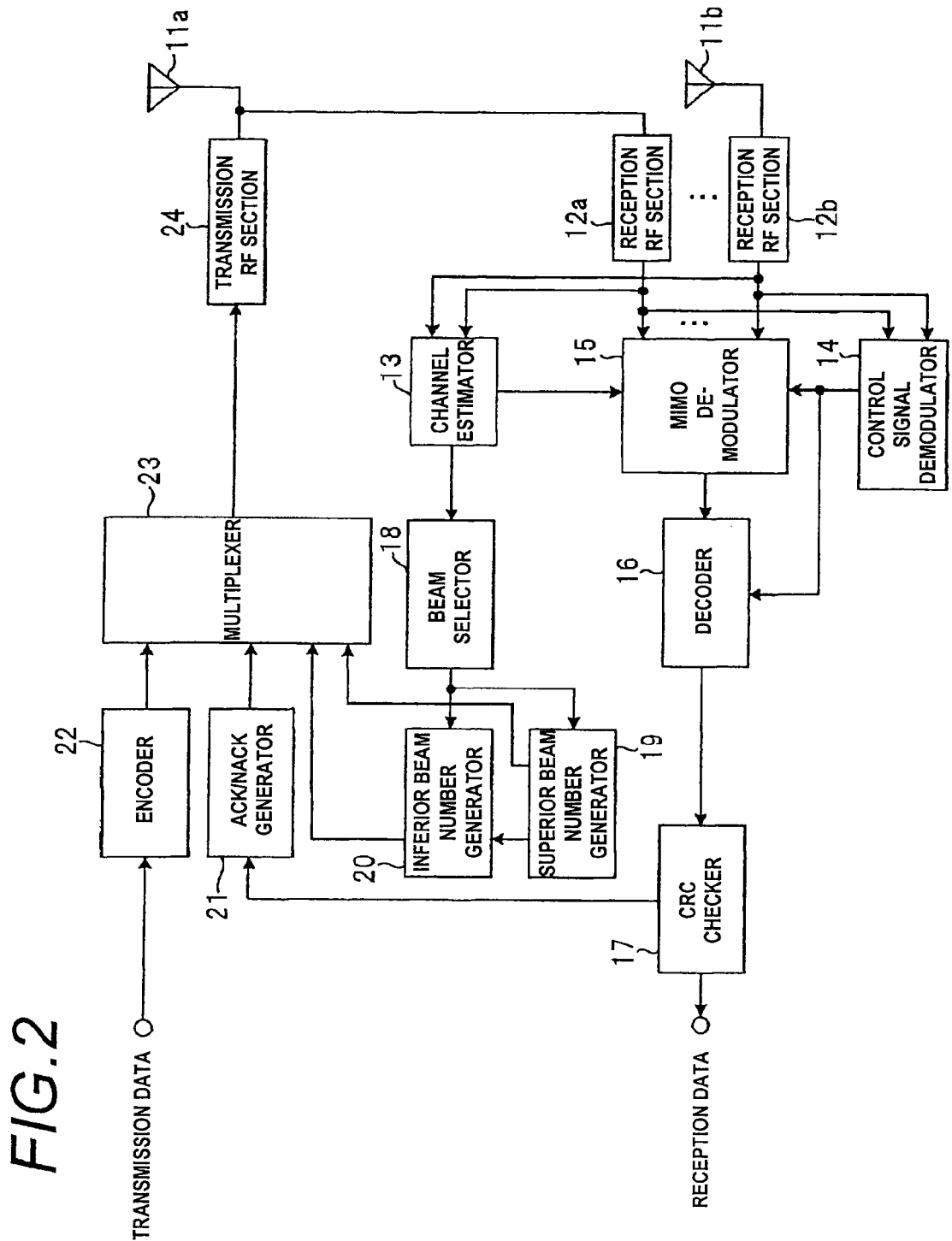
FIG. 2 is a block diagram to show the configuration of the main part of a reception station (reception apparatus) used in a first embodiment of the invention.
Figure 3:
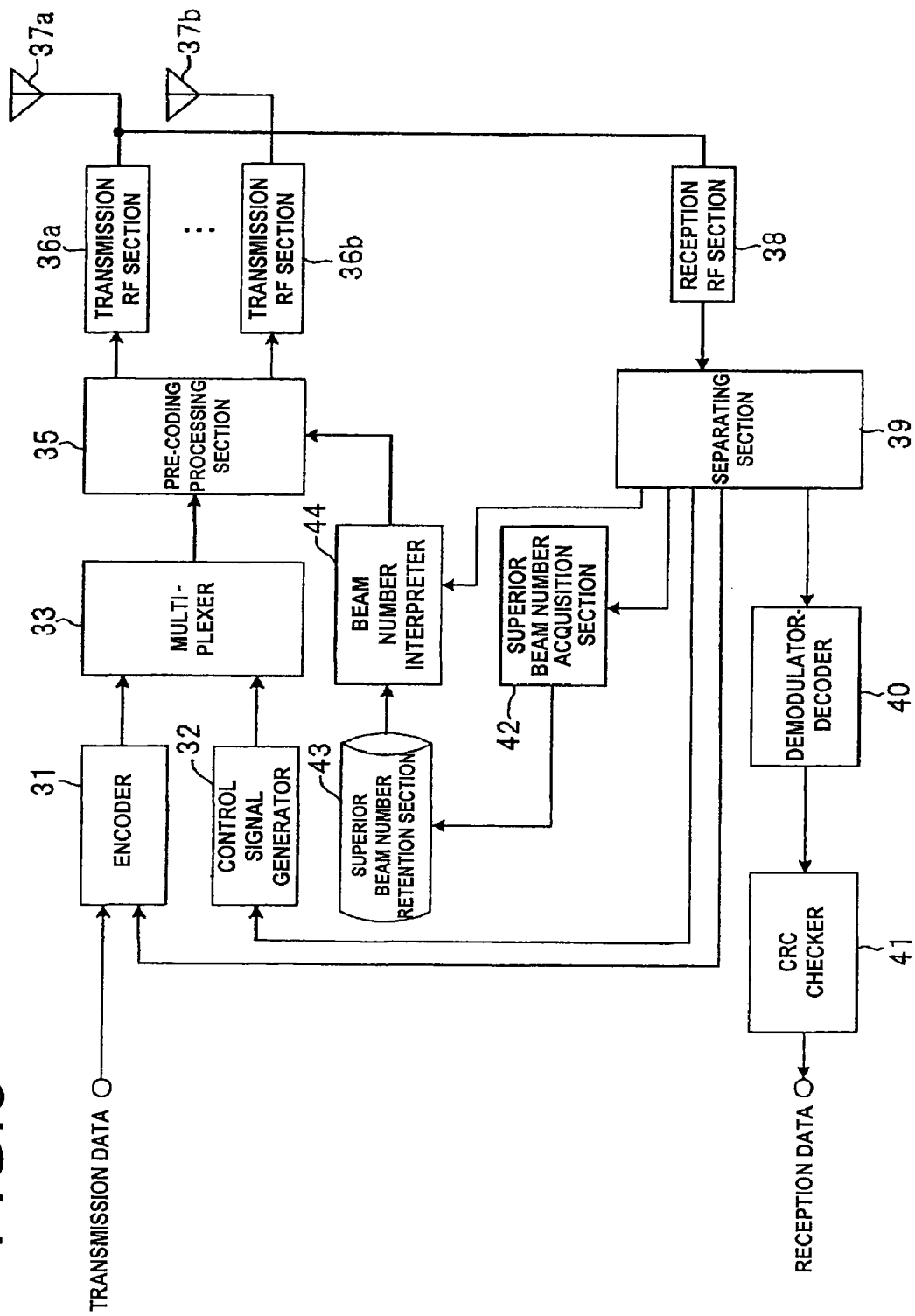
FIG. 3 is a block diagram to show the configuration of the main part of a transmission station (transmission apparatus) used in the first embodiment of the invention.

FIG. 2 is a block diagram to show the configuration of the main part of a reception station (reception apparatus) used in a first embodiment of the invention, and FIG. 3 is a block diagram to show the configuration of the main part of a transmission station (transmission apparatus) used in the first embodiment of the invention.

The embodiment assumes the case where radio communications are conducted using a radio wave between the reception station shown in FIG. 2 and the transmission station shown in FIG. 3. For example, it is assumed that the transmission station (transmission apparatus) shown in FIG. 3 is applied to a radio communication base station apparatus (radio base station, BS) of a cellular system for providing communication service of mobile communications of mobile telephones, etc., and the reception station (reception apparatus) shown in FIG. 2 is applied to a user equipment (UE) of a radio communication mobile station apparatus of a mobile telephone apparatus, etc. The description is predicated on configuring of an MIMO (Multiple-Input Multiple-Output) system for performing radio transmission and reception using a plurality of antennas in both transmission and reception. For example, the case where communications are conducted according to a multicarrier communication system using an OFDM (Orthogonal Frequency Division Multiplexing) signal and sequential transmission is executed in packet units, etc., is assumed as the mode of a communication signal.

The reception station shown in FIG. 2 includes a plurality of antennas 11a and 11b, a plurality of reception RF sections 12a and 12b, a channel estimator 13, a control signal demodulator 14, a MIMO demodulator 15, a decoder 16, a cyclic redundancy check (CRC) checker 17, a beam selector 18, a superior beam number generator 19, an inferior beam number generator 20, an acknowledgement/negative acknowledgement (ACK/NACK) generator 21, an encoder 22, a multiplexer 23, and a transmission RF section 24.

A radio wave transmitted from a remote station (for example, the transmission station shown in FIG. 3) is received by the independent antennas 11a and 11b. The high-frequency signal of the radio wave received at the antenna 11a is converted into a signal of a comparatively low frequency band such as a baseband signal in the reception RF section 12a and then the signal is subjected to processing of Fourier transform, parallel/serial conversion, etc., and is converted into a reception signal of serial data. Likewise, the high-frequency signal of the radio wave received at the antenna 11b is converted into a signal of a comparatively low frequency band such as a baseband signal in the reception RF section 12b and then the signal is subjected to processing of Fourier transform, parallel/serial conversion, etc., and is converted into a reception signal of serial data. The outputs of the reception RF sections 12a and 12b are input to the channel estimator 13, the control signal demodulator 14, and the MIMO demodulator 15.

The channel estimator 13 executes channel estimation based on a pilot signal contained in the signal transmitted from each transmission antenna of the remote station (transmission station) and calculates a channel estimation value. The calculated channel estimation value is input to the MIMO demodulator 15 and the beam selector 18. The control signal demodulator 14 demodulates a control signal transmitted together with the pilot signal and extracts transmission parameters indicating the modulation system, the encoding ratio, etc., of the transmission signal, the beam number indicating a beam pattern of the transmitted signal, and the like. The demodulated control signal is input to the MIMO demodulator 15 and the decoder 16. The beam information transmitted to and received from the remote station may be the number identifying each beam, the beam number of a code, etc., or may be ID information corresponding to the number, the code, etc., or the like.

The MIMO demodulator 15 uses the channel estimation value received from the channel estimator 13 to perform demodulation processing of the reception signal corresponding to the local station. The MIMO demodulator 15 performs deinterleave processing, rate dematching processing so that the number of modulation multiple values and the encoding ratio match those of the transmission side, likelihood combining processing of combining likelihood information of the past reception signal and likelihood information of the current reception signal, and the like. The decoder 16 performs decoding processing of the reception signal input from the MIMO demodulator 15 and restores the received data. The CRC checker 17 executes CRC (Cyclic Redundancy Check) check of the data output from the decoder 16 and checks whether or not data error occurs. The data is output as reception data from the CRC checker 17.

The beam selector 18 determines the reception state of a pilot signal based on the channel estimation value and outputs information concerning the quality and the rank of each beam to select any desired beam by pre-coding from the reception signal quality when the beam of each stipulated beam pattern transmitted from the remote station (transmission station) is assumed. At this time, the beam selector 18 calculates the SINR (Signal-to-Interference plus Noise power Ratio) corresponding to each beam and outputs the beam number and the order of the SINR corresponding thereto to the superior beam number generator 19 and the inferior beam number generator 20.

The superior beam number generator 19 cuts the beam number superior in SINR among the beam numbers received from the beam selector 18 as superior beam information every predefined period set to a comparatively long time, and outputs the superior beam number to the inferior beam number generator 20 and the multiplexer 23. The superior beam number generator 19 outputs nothing to the multiplexer 23 except at the corresponding output timing based on the predefined period.

The inferior beam number generator 20 selects an inferior beam except the beam number output by the superior beam number generator 19 for the beam number received from the beam selector 18 and outputs the inferior beam number selected so as to become the number of ranks in total (the total number of selected beams) to the multiplexer 23. The output method of the inferior beam number is described later in detail.

The ACK/NACK generation section 21 generates an ACK/NACK signal based on the CRC check in the CRC checker 17 and outputs the ACK/NACK signal to the multiplexer 23. Here, if the decoding result is OK and reception ends in success, ACK (Acknowledgement) is output as a response signal; if the decoding result is NG and reception ends in failure, NACK (Negative Acknowledgement) is output as a response signal. The encoder 22 performs coding processing of the transmission data and outputs the data to the multiplexer 23. The multiplexer 23 performs multiplex processing of the input beam number, the input ACK/NACK signal, the input transmission signal containing the coded transmission data, etc. The multiplexer 23 performs rate matching processing of adaptively setting the number of modulation multiple values and the encoding ratio, interleave processing, modulation processing, etc., and outputs the result to the transmission RF section 24.

The transmission RF section 24 performs processing of serial/parallel conversion, inverse Fourier transform, etc., and then converts the signal into a radio-frequency signal of a predetermined radio frequency band and performs power amplification and then transmits the signal as a radio wave from the antenna 11a. At this time, the transmission signal containing the beam number and the ACK/NACK signal transmitted from the reception station is transmitted to the transmission station as a feedback signal.

In the configuration described above, the beam selector 18 implements the function of a beam selector. The superior beam number generator 19 implements the function of a superior beam information generator, and the inferior beam number generator 20 implements the function of an inferior beam information generator. The multiplexer 23 and the transmission RF section 24 implement the function of a feedback information transmitter.

On the other hand, the transmission station shown in FIG. 3 includes an encoder 31, a control signal generator 32, a multiplexer 33, a pre-coding processing section 35, a plurality of transmission RF sections 36a and 36b, a plurality of antennas 37a and 37b, a reception RF section 38, a separating section 39, a demodulator-decoder 40, a CRC checker 41, a superior beam number acquisition section 42, a superior beam number retention section 43, and a beam number interpreter 44.

A radio wave transmitted from a remote station (for example, the reception station shown in FIG. 2) is received by the antenna 37a. The high-frequency signal of the radio wave received at the antenna 37a is converted into a signal of a comparatively low frequency band such as a baseband signal in the reception RF section 38 and then the signal is input to the separating section 39. The separating section 39 separates the portion corresponding to a feedback signal from the reception signal and extracts and outputs the beam number, the ACK/NACK signal, etc., contained in the feedback signal. The beam number is input to the superior beam number acquisition section 42 and the beam number interpreter 44, and the ACK/NACK signal is input to the control signal generator 32 and the encoder 31.

The demodulator-decoder 40 performs demodulation processing and decoding processing of the reception signal separated in the separating section 39 to restore the received data. The CRC checker 41 executes CRe check of the data output from the demodulator-decoder 40 and determines whether or not data error occurs and the CRC checker 41 outputs the data as reception data.

The encoder 31 performs coding processing of transmission data and outputs the data to the multiplexer 33. The control signal generator 32 generates and outputs a control signal containing transmission parameters indicating the modulation system, the encoding ratio, etc., of the transmission signal, and the like. The multiplexer 33 performs multiplex processing of the transmission signal containing the coded transmission data, the control signal containing the transmission parameters, etc., and the like. The multiplexer 33 performs rate matching processing of adaptively setting the number of modulation multiple values and the encoding ratio, interleave processing, modulation processing, etc., and outputs the result to the pre-coding processing section 35.

The superior beam number acquisition section 42 acquires the beam number superior in SINR among the beam numbers received from the separating section 39 as superior beam information and outputs the superior beam number to the superior beam number retention section 43. The superior beam number retention section 43 retains the superior beam number received from the superior beam number acquisition section 42 at least in a predefined period set to a comparatively long time, and outputs the superior beam number to the beam number interpreter 44. The beam number interpreter 44 determines all beam numbers to be used for transmission using the inferior beam number among the beam numbers received from the separating section 39 and the superior beam number received from the superior beam number retention section 43, and outputs the beam number to the pre-coding processing section 35.

The pre-coding processing section 35 performs pre-coding processing for the output of the multiplexer 33 using the beam number received from the beam number interpreter 44. At this time, the pre-coding processing section 35 separates and generates transmission signals to be output to the antennas, performs weighting processing to form a beam corresponding to the specified beam number, and outputs the transmission signals to the transmission RF sections 36a and 36b.

The transmission RF sections 36a and 36b perform processing of serial/parallel conversion, inverse Fourier transform, etc., of the transmission signals and then convert the signals each into a high-frequency signal of a predetermined radio frequency band and perform power amplification and then transmits each signal as a radio wave from the antennas 37a and 37b. The transmission signals from the transmission station are transmitted to the reception station as a pilot signal, a control signal, a data signal containing various pieces of data, and the like. The pilot signal and the control signal are transmitted each as a non-directional signal forming no beam in a pilot channel or a signal forming all beams in order, and the data signal is transmitted as a directional signal forming a predetermined beam responsive to the beam number by precoding in a predetermined transmission channel.

In the configuration described above, the separating section 39, the superior beam number acquisition section 42, the superior beam number retention section 43, and the beam number interpreter 44 implement the function of a beam information acquisition section; the superior beam number retention section 43 implements the function of a superior beam information retention section and the beam number interpreter 44 implements the function of a beam information interpreter. The multiplexer 33 and the transmission RF sections 36a and 36b implement the function of a transmitter.

Figure 4:
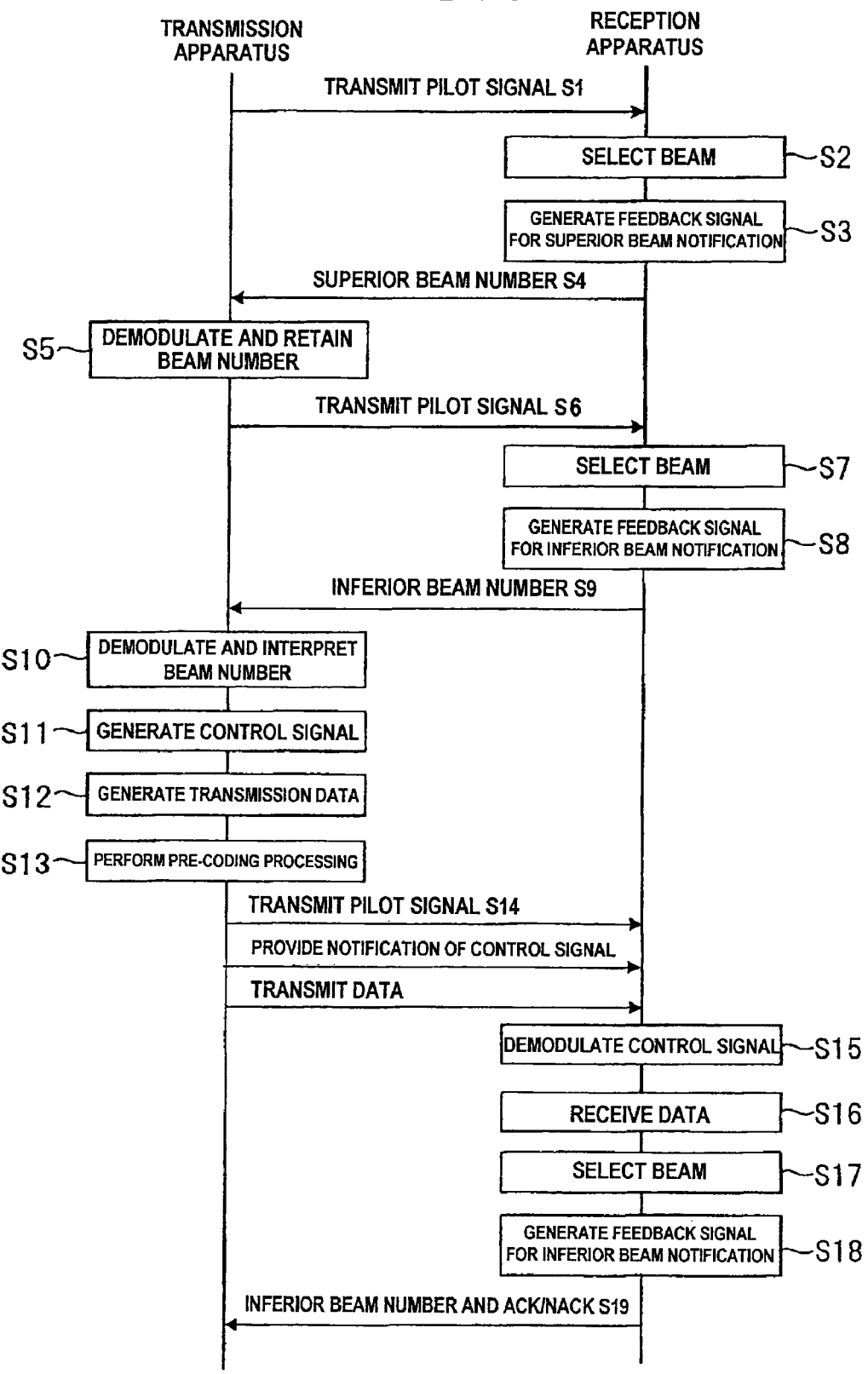
FIG. 4 is a sequence chart to show a specific example of a procedure of overall processing concerning communications between the transmission station and the reception station in the first embodiment.

Next, a processing procedure for the reception station shown in FIG. 2 and the transmission station shown in FIG. 3 to conduct communications with each other in the embodiment will be described below with reference to FIG. 4: FIG. 4 is a sequence chart to show a specific example of the procedure of overall processing concerning communications between the transmission station and the reception station in the embodiment.

At step S1, the transmission station (transmission apparatus) transmits a pilot signal to the reception station (reception apparatus) through a pilot channel. At step S2, the reception station (reception apparatus) receives the pilot signal and measures and checks the reception state of the pilot channel. The beam selector 18 calculates the SINR corresponding to each beam and keeps track of the SINR order as beam selection processing to select any desired beam based on the reception quality. The SINR order corresponding to the beam numbers is output to the superior beam number generator 19 and the inferior beam number generator 20.

At step S3, a feedback signal for superior beam notification containing the superior beam number of the beam corresponding to the superior SINR having a high quality rank, of the beam numbers of the beams selected at step S2 is generated. At this time, the superior beam number generator 19 extracts the beam number of the beam corresponding to the superior SINR from the selected beam numbers based on the beam numbers and the SINR order received from the beam selector 18, and generates the superior beam number as a feedback signal for superior beam notification containing information specifying the beam number. The generated superior beam number is output to the inferior beam number generator 20 and the multiplexer 23. Subsequently, at step S4, the feedback signal containing the superior beam number is transmitted to the transmission station. To feed back the superior beam number, the feedback signal may be a signal containing both the superior beam number and the inferior beam number or may be a signal containing only the superior beam number.

At step S5, the transmission station demodulates and retains the beam number fed back from the reception station. At this time, the separating section 39 outputs the separated beam number to the superior beam number acquisition section 42. The superior beam number acquisition section 42 acquires the superior beam number and retains the acquired superior beam number in the superior beam number retention section 43. At step S6, a pilot signal is transmitted through the pilot channel as at step S1.

At step S7, the reception station receives the pilot signal as at step S2, and the beam selector 18 calculates the SINR corresponding to each beam and keeps track of the SINR order. At step S8, a feedback signal for inferior beam notification containing the inferior beam number of the beam corresponding to the inferior SINR excluding the superior beam number notified at step S4 is generated. At this time, the inferior beam number generator 20 extracts the beam number having a high quality rank in the number order excluding the superior beam number extracted at step S3 as the inferior beam number, and generates it as a feedback signal for inferior beam notification containing information specifying the beam number. That is, the inferior beam number generator 20 generates a feedback signal for providing notification of the inferior beam number of the beam corresponding to the inferior SINR so as to become the number of ranks in total excluding the beam number output by the superior beam number generator 19, of the beam numbers selected based on the reception quality and received from the beam selector 18. The generated inferior beam number is output to the multiplexer 23. Subsequently, at step S9, the feedback signal containing the inferior beam number is transmitted to the transmission station.

A specific example of feedback signals for providing notification of the superior beam numbers and the inferior beam number will be described. In the example, the reception station selects three beams each having a high quality rank from among six beams that can be formed by the transmission station, and the superior two of the three beams are fixed in the predefined period based on the predetermined time period, as illustrated in FIG. 1. To provide notification of the superior beam numbers, it is assumed that three beams of beam 'b': CQI 18, beam 'c': CQI 12, and beam 'e': CQI 9, of beams 'a' to 'f' are observed as beams having a high quality rank. In this state, notification of the beam numbers of the superior two beams 'b' and 'c' each having the large CQI value, of the three beams is provided. In this case, two beams are selected from all six beams and thus the beam numbers may be fed back in a total of six bits, three bits per beam or may be fed back in four bits capable of representing $_6C_2=15$ combinations.

To provide notification of the inferior beam number, the superior beam numbers 'b' and 'c' are fixed for the predetermined time period and thus notification of the beam number of one beam of the large CQI value from among the four beams 'a', 'd', 'e', and 'f' excluding the already reported beams 'b' and 'c' is provided. If a large change does not occur in the CQI values, notification of the beam 'e' is provided. In this case, one beam is selected from four beams and thus every beam number can be fed back using two bits. Therefore, the resources when notification of the inferior beam number is provided can be decreased as compared with those when notification of the superior beam numbers is provided.

At step S10, the transmission station demodulates the beam number fed back from the reception station and interprets the selected beam numbers. At this time, the separating section 39 outputs the beam number to the beam number interpreter 44. The beam number interpreter 44 then interprets the beam numbers selected by the reception station and to be used for transmission using the superior beam numbers retained in the superior beam number retention section 43 at step S5 and the inferior beam number fed back this time. At step S11, the control signal generator 32 generates a control signal containing transmission parameters (modulation system and encoding ratio) and the beam numbers addressed to the reception station from which the feedback signal has been received and to which the control signal, etc., is to be transmitted according to the beam numbers interpreted at step S10.

Subsequently, at step S12, the encoder 31 encodes transmission data and the multiplexer 33 performs multiplex processing with the control signal, etc., to generate a data signal containing the transmission data. Then, at step S13, the pre-coding processing section 35 performs pre-coding processing corresponding to the beam number desired by the reception station for the transmission signal transmitted according to the beam numbers interpreted at step S10. At step S14, a pilot signal is transmitted as at step S1 and the control signal and the data signal are transmitted from the transmission station to the reception station.

In the reception station, at step S15, the control signal demodulator 14 demodulates the control signal and takes out the transmission parameters of the modulation system, the encoding ratio, etc., and the beam numbers. Subsequently, at step S16, the channel estimator 13 finds the channel estimation value corresponding to the received beam and the MIMO demodulator 15 and the decoder 16 demodulate and decode the reception data according to the beam numbers, the modulation system, and the encoding ratio acquired at step S15, thereby performing data reception processing.

Next, at step S17, the beam selector 18 calculates the SINR corresponding to each beam and keeps track of the SINR order. At step S18, the inferior beam number generator 20 extracts the beam number having the high quality rank in the number order excluding the superior beam numbers reported at step S4 (the beam number of the beam corresponding to the inferior SINR) as the inferior beam number and generates a feedback signal for providing inferior beam notification containing information specifying the beam number as at step S8. At this time, the inferior beam number is output to the multiplexer 23. Subsequently, at step S19, the feedback signal containing the inferior beam number and an ACK/NACK signal indicating whether the data reception processing ends in success or failure is transmitted to the transmission station.

Processing at steps S10 to S19 is repeated for a predetermined time period and notification of only the inferior beam number is provided as the beam number notified from the reception station to the transmission station. After the expiration of the predetermined time period, the process returns to step S1 and notification of the superior beam number is once provided and then the processing at steps S10 to S19 is repeated and notification of only the inferior beam number is provided until the expiration of the predetermined time period. Since the superior beam number having the high quality rank is fixed for the predetermined time period, a comparatively long time period (for example, several tens of ms to several hundreds of ms) is set in a range in which the superior beam number does not vary. The processing is repeated every predetermined time period, whereby the beam number superior in SINR is output every predefined period set to a comparatively long time from the superior beam number generator 19 of the reception station and is fed back to the transmission station. Only the inferior beam number is output from the inferior beam number generator 20 at any timing except for the output timing of the superior beam number and is fed back to the transmission station. Therefore, as compared with the case where notification of all selected beam numbers is provided, notification of the superior beam number is provided in the predetermined period and then only the inferior beam number is fed back within the predetermined time period, so that the resources required for providing notification of the beam numbers are reduced.

As described above, in the first embodiment, when feedback for subset selection is executed in radio communications using the pre-coding, notification of the superior beam number corresponding to the beam having the high quality rank is provided every predefined period, the superior beam number corresponding to the superior beam is fixed without being fed back at any other timing, the beam having the high quality rank is selected as the inferior beam from among the remaining beams, and the inferior beam number corresponding to the inferior beam is fed back. Accordingly, the transmission station can obtain information equivalent to that provided when all selected beam numbers from the reception station are fed back at all times, so that the signaling amount of the feedback signal can be reduced without performance degradation caused by a control delay. Therefore, it is made possible to select a plurality of beams efficiently in the pre-coding control and throughput can be enhanced.

SECOND EMBODIMENT

Figure 5:
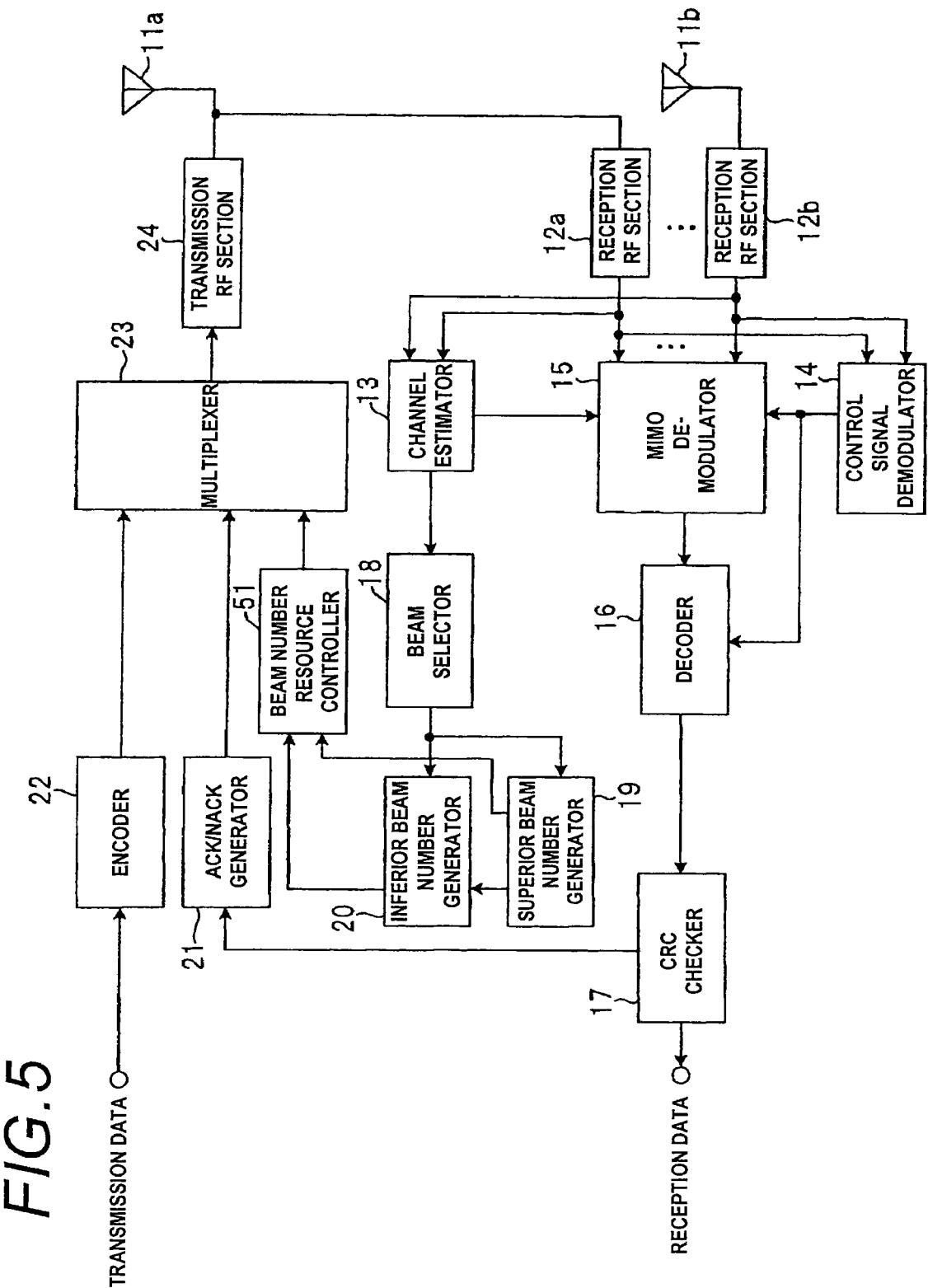
FIG. 5 is a block diagram to show the configuration of the main part of a reception station (reception apparatus) used in a second embodiment of the invention.
Figure 6:
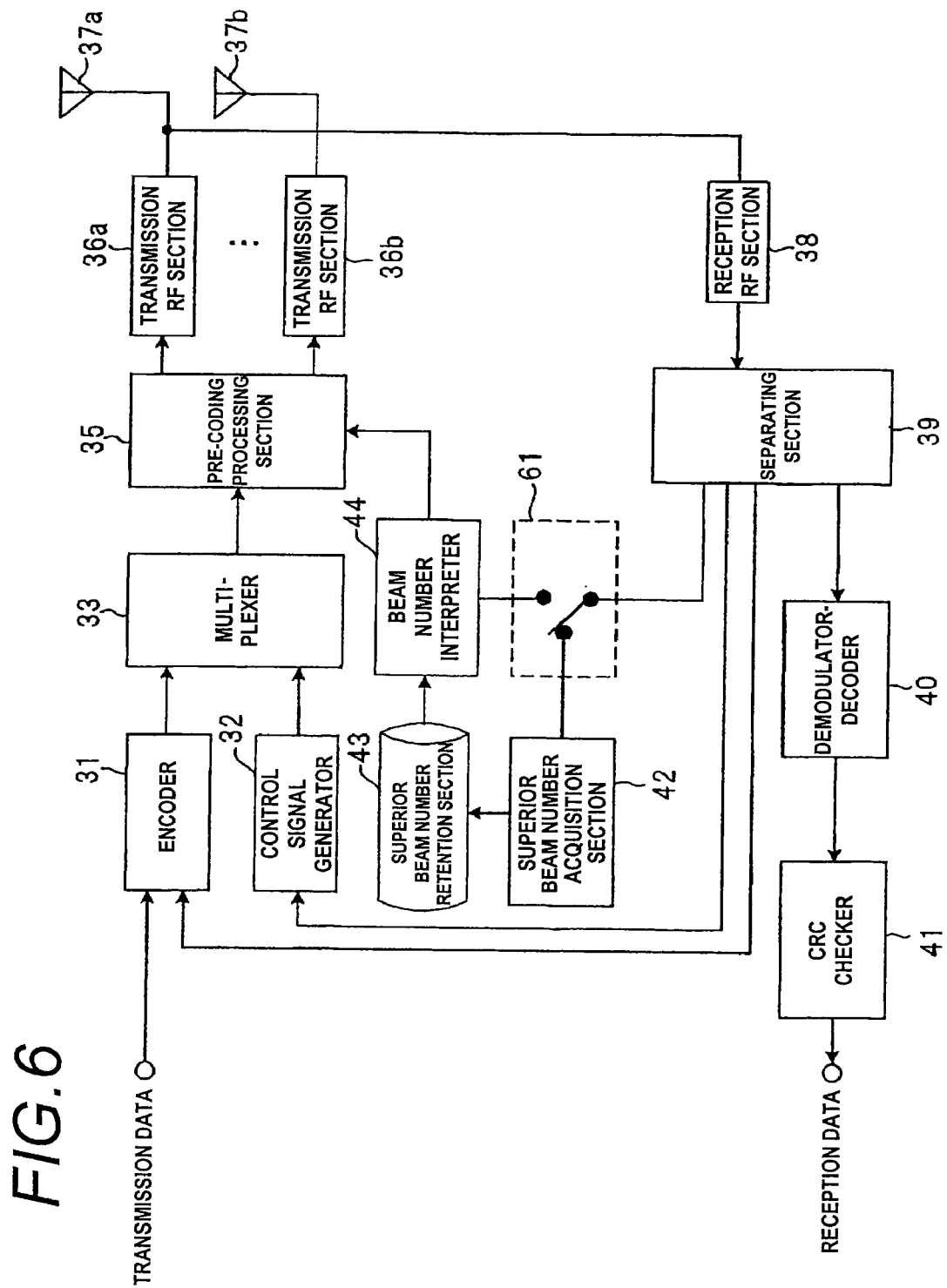
FIG. 6 is a block diagram to show the configuration of the main part of a transmission station (transmission apparatus) used in the second embodiment of the invention.

FIG. 5 is a block diagram to show the configuration of the main part of a reception station (reception apparatus) used in a second embodiment of the invention, and FIG. 6 is a block diagram to show the configuration of the main part of a transmission station (transmission apparatus) used in the second embodiment of the invention.

The second embodiment is an example provided by changing a part of the first embodiment. Elements similar to those of the first embodiment are denoted by the same reference numerals in the second embodiment and will not be described again in detail.

The second embodiment shows the configuration assuming that the number of resources required for providing notification of each inferior beam number is larger than the number of resources required for providing notification of each superior beam number. This assumption holds if the number of superior beams is one and the number of inferior beams is two when beam numbers are fed back from the reception station to the transmission station, for example. In this case, the necessary number of bits is three for notification of the superior beam number (six candidates) and is four for notification of the inferior beam numbers ($_5C_2$=10 candidates).

In the assumption, when feeding back the superior beam number fixed for a predetermined time period of a comparatively long time to the transmission station, the reception station feeds back the superior beam number using at least a part of the resource amount required for notification of the inferior beam numbers, namely, the resources secured for notification of the inferior beam numbers. For example, to provide notification of the superior beam number, notification of the inferior beam numbers is not provided and a signal repeating the superior beam number is fed back using the surplus resources for notification of the inferior beam numbers. Accordingly, the surplus resources with the inferior beam numbers skipped can be utilized for reliability improvement of the superior beam number. The transmission station interprets the feedback signal of the superior beam number fixed for the predetermined time period from the reception station and uses the signal for pre-coding at the data transmission.

The reception station shown in FIG. 5 includes a beam number resource controller 51 as a new component in addition to the configuration in FIG. 2. The beam number resource controller 51 implements the function of a beam information resource controller. The beam number resource controller 51 inputs the superior beam number from a superior beam number generator 19 and the inferior beam numbers from an inferior beam number generator 20, performs resource control for beam number notification, and outputs the beam numbers. To provide notification of the superior beam number, the beam number resource controller 51 generates a feedback signal for superior beam notification using the resources secured for notification of the inferior beam numbers. For example, in the example wherein the number of superior beams is one and the number of inferior beams is two as described above, three-bit information is transmitted using the resources required for transmitting four bits, the same resources as those for notification of the inferior beam numbers, for notification of the superior beam number. That is, one beam number is fed back using resources for two beam numbers. Accordingly, the 4/3-times signal strength can be secured.

On the other hand, the transmission station shown in FIG. 6 includes a beam number output switch section 61 as a new component in addition to the configuration in FIG. 3. The beam number output switch section 61 implements the function of a beam information switch section. The beam number output switch section 61 performs output switching of the beam number output from a separating section 39 in response to a predefined timing and outputs the beam number only to either a superior beam number acquisition section 42 or a beam number interpreter 44. At the timing of receiving a feedback signal for superior beam notification, the beam number is output to the superior beam number acquisition section 42 and the superior beam number is retained in a superior beam number retention section 43. At the timing of receiving a feedback signal for inferior beam notification, the beam number is output to the beam number interpreter 44. The beam number interpreter 44 then interprets all beam numbers selected according to the superior beam number retained in the superior beam number retention section 43 and the inferior beam number received this time.

As described above, in the second embodiment, when feedback for subset selection is executed in radio communications using the pre-coding, an occasion for providing notification of only the superior beam number corresponding to the beam having the high quality rank is provided, the resources provided for inferior beam number notification are also used for superior beam number notification, and a signal repeating the superior beam number is fed back. Accordingly, the signal strength at the time of providing notification of the superior beam number can be secured and in the transmission station, the higher-reliability feedback signal can be received and notification of the superior beam number can be provided with high reliability.

THIRD EMBODIMENT

Figure 7:
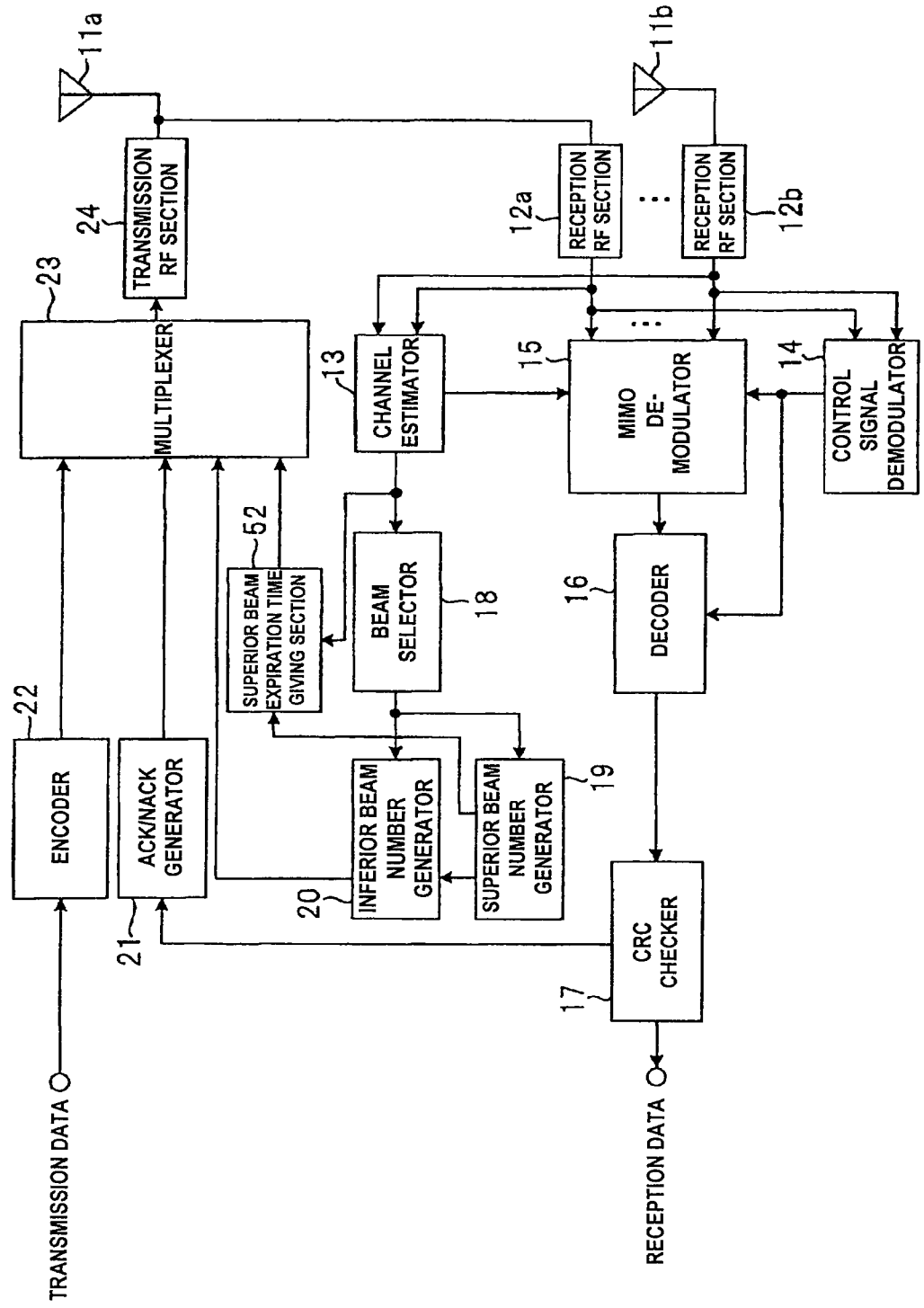
FIG. 7 is a block diagram to show the configuration of the main part of a reception station (reception apparatus) used in a third embodiment of the invention.
Figure 8:
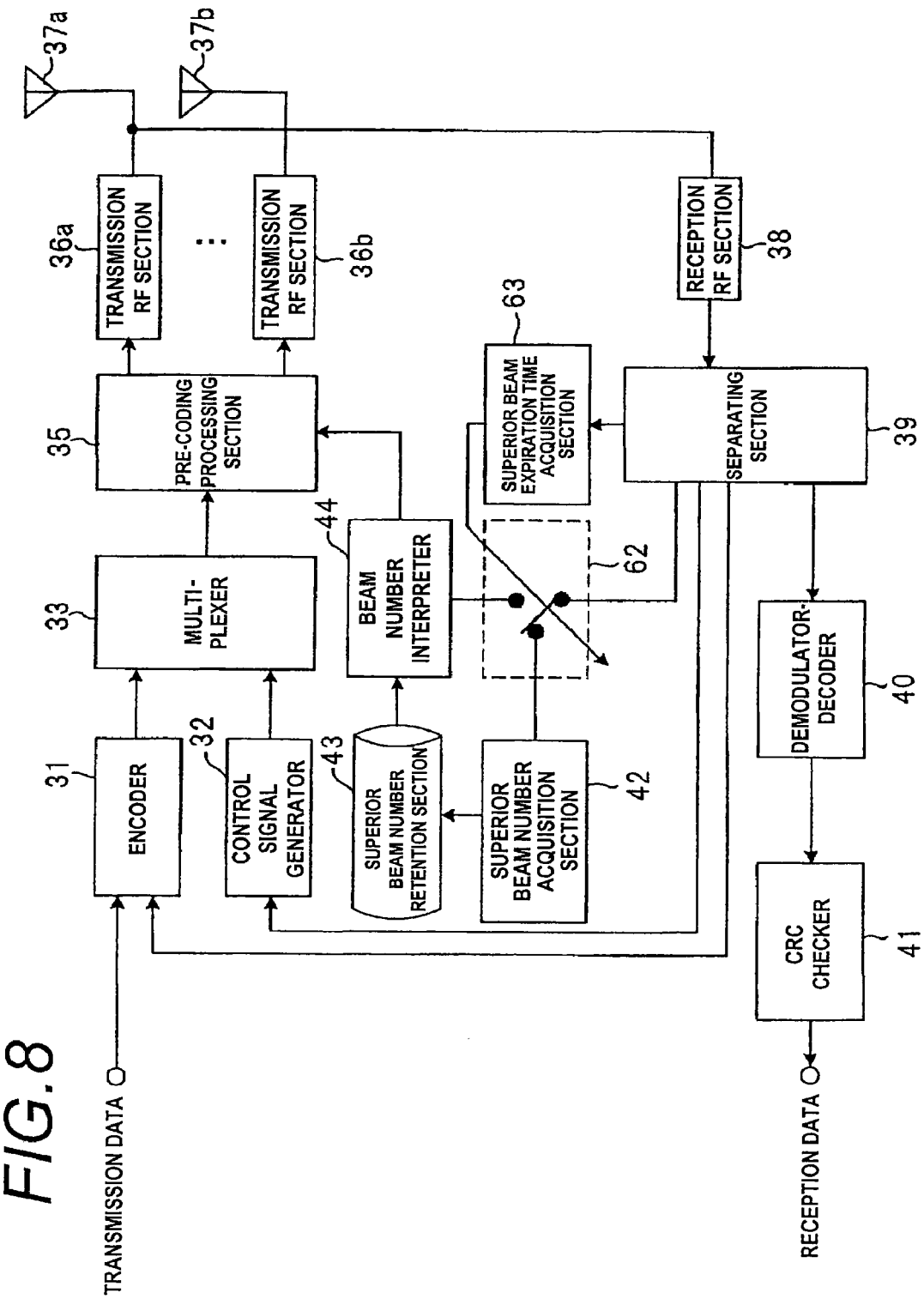
FIG. 8 is a block diagram to show the configuration of the main part of a transmission station (transmission apparatus) used in the third embodiment of the invention.

FIG. 7 is a block diagram to show the configuration of the main part of a reception station (reception apparatus) used in a third embodiment of the invention, and FIG. 8 is a block diagram to show the configuration of the main part of a transmission station (transmission apparatus) used in the third embodiment of the invention.

The third embodiment is an example provided by changing a part of the first embodiment. Elements similar to those of the first embodiment are denoted by the same reference numerals in the third embodiment and will not be described again in detail.

In the third embodiment, when feeding back the superior beam number fixed for a predetermined time period of a comparatively long time to the transmission station, the reception station feeds back a signal containing information corresponding to the length of the fixing predetermined time period. Accordingly, the reception station can notify the transmission station of the duration of fixing the superior beam number. The transmission station interprets the feedback signal corresponding to the length of the fixing predetermined time period from the reception station and uses it for interpreting and pre-coding of the superior and inferior beam numbers at the data transmitting time.

The reception station shown in FIG. 7 includes a superior beam expiration time giving section 52 as a new component in addition to the configuration in FIG. 2. The superior beam expiration time giving section 52 implements the function of a superior beam fixing time period information giving section. The superior beam expiration time giving section 52 guesses time variation of a propagation channel between the transmission station and the reception station from output of a channel estimator 13. The superior beam expiration time giving section 52 sets the expiration time of the superior beam number as the length of the predetermined time period of fixing the superior beam number based on the guessed time variation of the propagation channel. As information indicating the length of the predetermined time period of fixing the superior beam, any of various pieces of information indicating the absolute time and the relative time indicating the expiration time, the absolute length and the relative length of the time of the time period, etc., may be used.

When outputting the superior beam number received from a superior beam number generator 19 to a multiplexer 23, the superior beam expiration time giving section 52 passes the superior beam number to the multiplexer 23 together with the expiration time information. Accordingly, the expiration time information of the superior beam number is given to a feedback signal. Operation examples can be named wherein if it is guessed that the time variation of the propagation channel is around 3 km/h of on the order of walking speed, the expiration time of the superior beam number is set to 500 ms and wherein if it is guessed that the time variation of the propagation channel is around 30 km/h on the order of moving speed of an automobile in a city, the expiration time is set to 50 ms.

On the other hand, the transmission station shown in FIG. 8 includes a beam number output switch section 62 and a superior beam expiration time acquisition section 63 as new components in addition to the configuration in FIG. 3. The superior beam expiration time acquisition section 63 implements the function of a superior beam fixing time period information acquisition section. The beam number output switch section 62 performs output switching of the beam number output from a separating section 39 based on a control signal from the superior beam expiration time acquisition section 63, and outputs the beam number only to either a superior beam number acquisition section 42 or a beam number interpreter 44. The superior beam expiration time acquisition section 63 acquires the expiration time of the superior beam number received from the separating section 39 and performs switch control so that the beam number is output only to the beam number interpreter 44 within the corresponding expiration time.

As described above, in the third embodiment, when feedback for subset selection is executed in radio communications using the pre-coding, a signal for providing notification of the duration of fixing the beam number corresponding to the beam having the high quality rank is fed back. Accordingly, the timing of feeding back the superior beam number the next time, namely, the time of skipping feedback of the inferior beam number can be previously secured in response to a change in the propagation status observed in the reception station. The time period of fixing the superior beam can be adaptively controlled in response to the propagation status.

FOURTH EMBODIMENT

Figure 9:
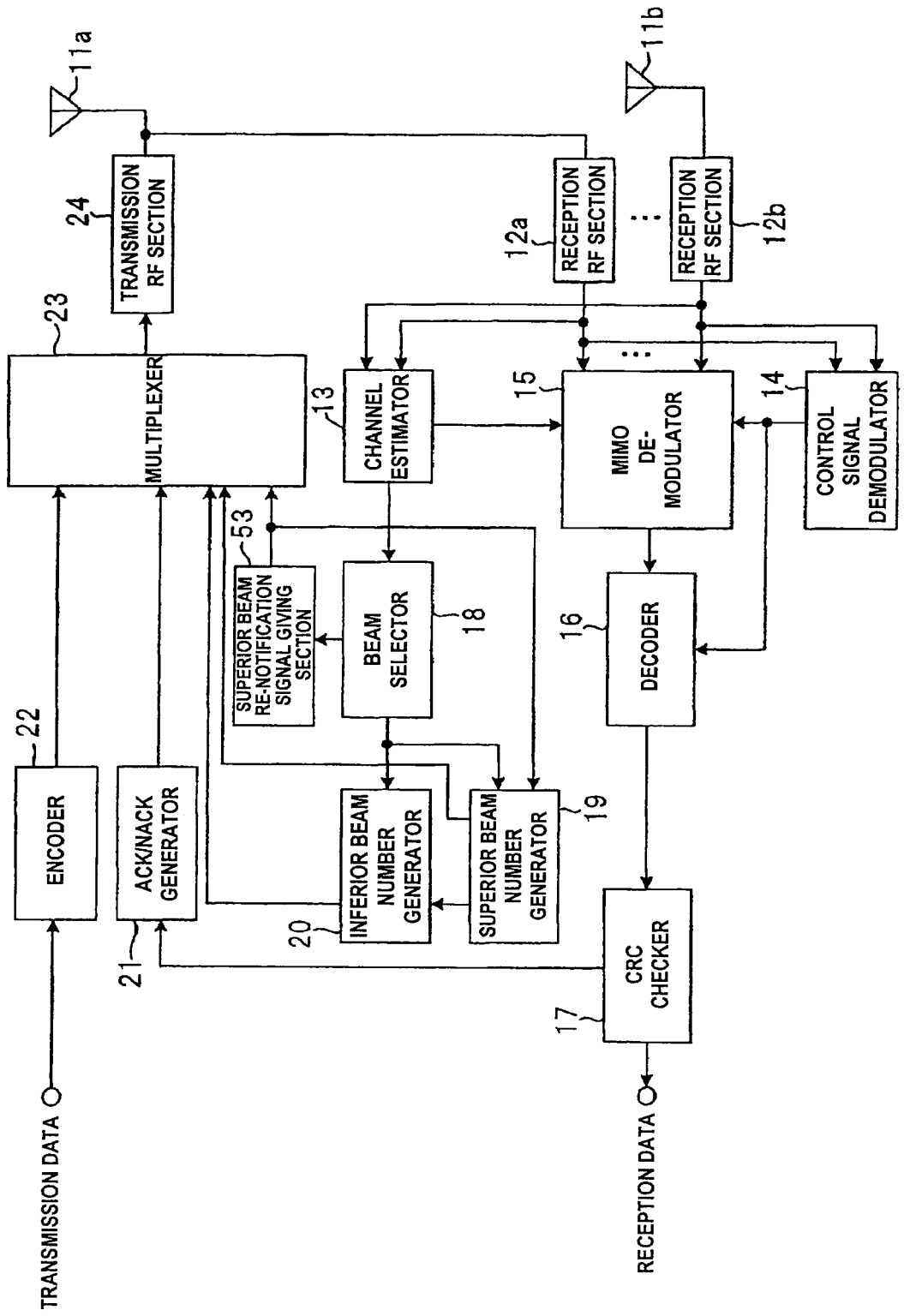
FIG. 9 is a block diagram to show the configuration of the main part of a reception station (reception apparatus) used in a fourth embodiment of the invention.
Figure 10:
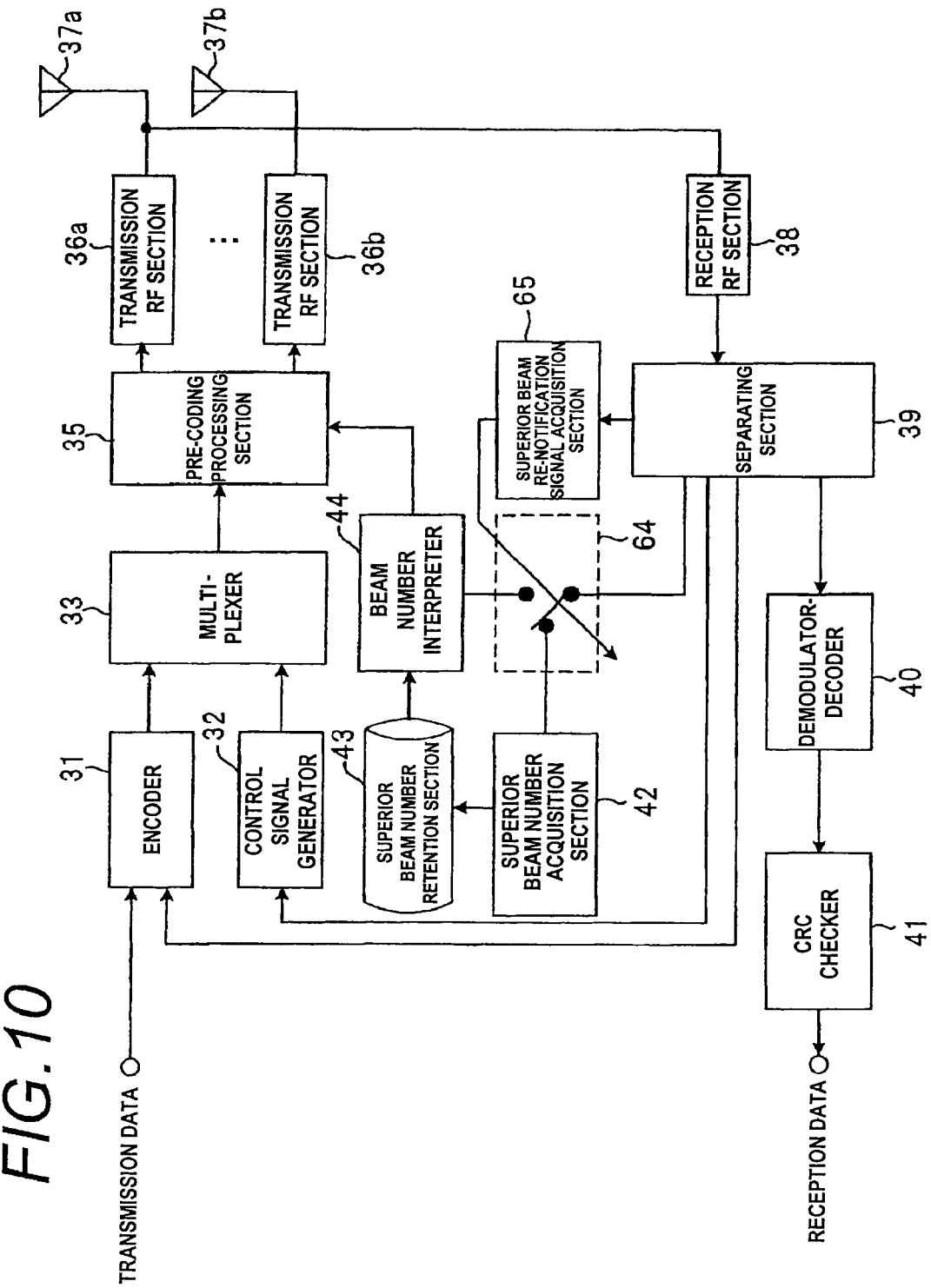
FIG. 10 is a block diagram to show the configuration of the main part of a transmission station (transmission apparatus) used in the fourth embodiment of the invention.
Figure 11:
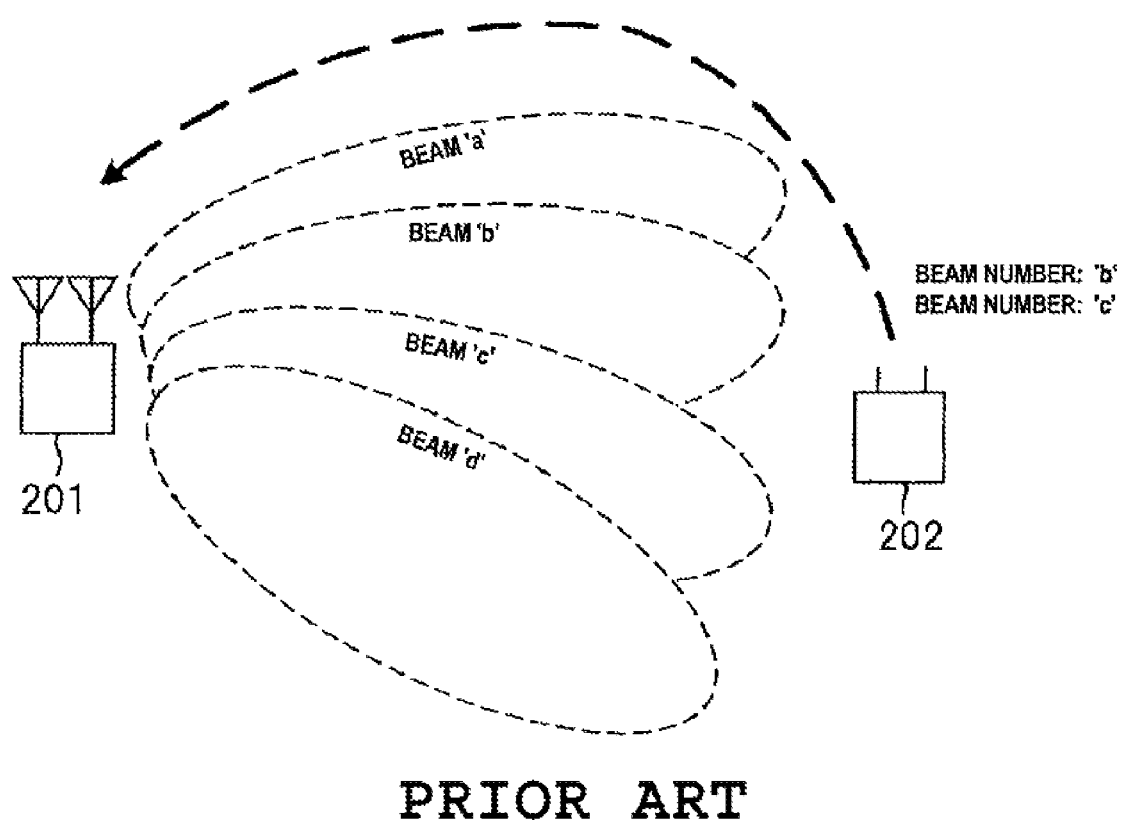
FIG. 11 schematically shows transmission beam formation by pre-coding.

FIG. 9 is a block diagram to show the configuration of the main part of a reception station (reception apparatus) used in a fourth embodiment of the invention, and FIG. 10 is a block diagram to show the configuration of the main part of a transmission station (transmission apparatus) used in the fourth embodiment of the invention.

The fourth embodiment is an example provided by changing a part of the first embodiment. Elements similar to those of the first embodiment are denoted by the same reference numerals in the fourth embodiment and will not be described again in detail.

In the fourth embodiment, when feeding back the inferior beam number to the transmission station with the superior beam number fixed for a predetermined time period of a comparatively long time, if the quality of the superior beam worsens, the reception station feeds back replacement of the superior beam and feeds back the superior beam number at the next notification time. Accordingly, the reception station can inform the transmission station of replacement of the superior beam within the predetermined time period of fixing the beam number having the high quality rank. The transmission station interprets the feedback signal corresponding to worsening of the quality of the superior beam and prepares for the fact that the superior beam number is contained in the next feedback and also receives the corresponding next feedback signal, interprets the corresponding beam number, and uses it pre-coding at the data transmitting time.

The reception station shown in FIG. 9 includes a superior beam re-notification signal giving section 53 as a new component in addition to the configuration in FIG. 2. The superior beam re-notification signal giving section 53 implements the function of a superior beam change information giving section. The superior beam re-notification signal giving section 53 detects the possibility that the superior beam may be replaced with the inferior beam because of quality degradation of the superior beam from output of a beam selector 18. Based on the detection result, as superior beam change information for giving a command of changing the superior beam number, a superior beam re-notification signal for giving a command of providing re-notification of the superior beam number is output to a multiplexer 23 and a superior beam number generator 19. When a feedback signal containing the beam number is generated, if the superior beam re-notification signal is output from the superior beam re-notification signal giving section 53, the multiplexer 23 adds the signal. The superior beam re-notification signal giving section 53 commands the multiplexer 23 to output the superior beam number from the superior beam number generator 19 at the next beam number notification time.

On the other hand, the transmission station shown in FIG. 10 includes a beam number output switch section 64 and a superior beam re-notification signal acquisition section 65 as new components in addition to the configuration in FIG. 3. The superior beam re-notification signal acquisition section 65 implements the function of a superior beam change information acquisition section. The beam number output switch section 64 performs output switching of the beam number output from a separating section 39 based on a control signal from the superior beam re-notification signal acquisition section 65, and outputs the beam number only to either a superior beam number acquisition section 42 or a beam number interpreter 44. If it is detected that the input signal received from the superior beam number generator 19 contains a superior beam re-notification signal, the superior beam re-notification signal acquisition section 65 controls so as to output the signal of the beam number to the superior beam number acquisition section 42 after the expiration of a predefined time.

As described above, in the fourth embodiment, when feedback for subset selection is executed in radio communications using the pre-coding, if the quality of the superior beam worsens within the time period during which the beam number corresponding to the beam having the high quality rank is fixed, the reception station commands the transmission station to provide re-notification of the superior beam number. Accordingly, the timing of feeding back the superior beam number the next time, namely, the time of skipping feedback of the inferior beam number can be adaptively controlled in response to a rapid change in the quality observed in the reception station.

In the embodiments described above, it is assumed that the transmission station and the reception station include each two antennas; however, the invention can also be applied in a similar manner if the number of antennas is increased to three, four, etc., as required. Likewise, the invention can also be applied to the number of beams set as required. In the embodiments, as the number of beams increases, the advantage increases on the scale of factorial.

As described above, the radio communication apparatus according to the invention can be installed in a mobile station apparatus (communication terminal) and a base station apparatus in a mobile communication system and accordingly a radio communication mobile station apparatus, a radio communication base station apparatus, and a mobile communication system having the advantages similar to those described above can be provided.

It is to be understood that the invention is not limited to the items shown in the embodiments described above and the invention is also intended for those skilled in the art to make modifications and application based on the Description of the invention and well-known arts and the modifications and the application are contained in the scope to seek protection.

The embodiments have been described by taking the case where the invention is embodied by hardware as an example, but the invention can also be implemented by software.

Each of the function blocks used in the description of the embodiments is implemented typically as an LSI of an integrated circuit. The function blocks may be put individually into one chip or may be put into one chip so as to contain some or all. Here, the integrated circuit is an LSI, but may be called an IC, a system LSI, a super LSI, or an ultra LSI depending on the difference in integration degree.

The technique of putting into an integrated circuit is not limited to an LSI and it may be implemented as a dedicated circuit or a general-purpose processor. An FPGA (Field Programmable Gate Array) that can be programmed after LSI is manufactured or a reconfigurable processor wherein connection and setting of circuit cells in LSI can be reconfigured may be used.

Further, if a technology of putting into an integrated circuit replacing LSI appears with the progress of the semiconductor technology or another deriving technology, the function blocks may be integrated using the technology, of course. There can be a possibility of applying a biotechnology, etc.

While the invention has been described in detail with reference to the specific embodiments, it will be obvious to those skilled in the art that various changes and modifications can be made without departing from the spirit and the scope of the invention.

INDUSTRIAL APPLICABILITY

The invention has the advantage that it can reduce the signaling amount in selecting a plurality of beams in the pre-coding and makes it possible to enhance throughput, and is useful as a radio communication apparatus, a radio communication system, a radio communication method, etc., that can be applied to MIMO (Multiple-Input Multiple-Output), etc., for conducting communications using a plurality of antennas.

The invention claimed is:

1. A radio communication apparatus comprising:
   a beam information generating section configured to generate beam information for forming a beam in a precoding, in which the beam is formed by weighting a signal transmitted from a transmission apparatus: and
   a feedback information transmitting section configured to transmit feedback information including the beam information to the transmission apparatus,
   wherein: said feedback information transmitting section transmits the feedback information including first beam information with a first period, and transmits the feedback information including second beam information with a second period, the first beam information and the second beam information being related to a part of plural beams; and the first period is longer than the second period.

2. The radio communication apparatus according to claim 1, wherein a number of bits for the second beam information is less than a number of bits for the first beam information.

3. The radio communication apparatus according to claim 1, wherein a number of beams, to which the first beam information is related, is more than a number of beams, to which the second beam information is related.

4. The radio communication apparatus according to claim 1, wherein a number of bits for the first beam information is less than a number of bits for the second beam information.

5. The radio communication apparatus according to claim 1, wherein a part of the plural beams is determined from the first beam information and the second beam information.

6. The radio communication apparatus according to claim 1, wherein a weight used in the precoding is determined from the first beam information and the second beam information.

7. The radio communication apparatus according to claim 1, further comprising a receiving section configured to receive a signal, which is transmitted from the transmission apparatus with a beam formed based on the first beam information and the second beam information.

8. The radio communication apparatus according to claim 1, wherein said feedback information transmitting section transmits the feedback information including the first beam information and the feedback information including the second beam information, respectively, at different timings.

9. The radio communication apparatus according to claim 1, wherein said feedback information transmitting section transmits the feedback information including the first beam information and the feedback information including the second beam information, respectively, using the same resource.

10. A radio communication method comprising:
    generating beam information for forming a beam in a precoding, in which the beam is formed by weighting a signal transmitted from a transmission apparatus; and
    transmitting feedback information including the beam information to the transmission apparatus,
    wherein: the feedback information including first beam information is transmitted with a first period, and the feedback information including second beam information is transmitted with a second period, the first beam information and the second beam information being related to a part of plural beams; and the first period is longer than the second period.

* * * * *